(12) United States Patent
Toyoda et al.

(10) Patent No.: US 9,348,062 B2
(45) Date of Patent: ***May 24, 2016

(54) IMAGE DISPLAY DEVICE

(71) Applicant: DEXERIALS CORPORATION, Tokyo (JP)

(72) Inventors: Tomoyuki Toyoda, Tochigi (JP); Yoshihisa Shinya, Tochigi (JP); Yusuke Kamata, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,902

(22) Filed: Jun. 9, 2014

(65) Prior Publication Data

US 2014/0287153 A1    Sep. 25, 2014

Related U.S. Application Data

(63) Continuation of application No. 12/450,263, filed as application No. PCT/JP2008/056996 on Apr. 9, 2008, now Pat. No. 8,821,966.

(30) Foreign Application Priority Data

| Apr. 9, 2007 | (JP) | 2007-102239 |
| Jul. 17, 2007 | (JP) | 2007-186360 |
| Jan. 11, 2008 | (JP) | 2008-005027 |

(51) Int. Cl.
*G02F 1/13* (2006.01)
*G02F 1/133* (2006.01)
(Continued)

(52) U.S. Cl.
CPC .............. *G02B 1/11* (2013.01); *G02B 1/105* (2013.01); *G02F 1/133308* (2013.01);
(Continued)

(58) Field of Classification Search
None
See application file for complete search history.

(56) References Cited

U.S. PATENT DOCUMENTS

| 5,073,477 A | 12/1991 | Kusuda et al. |
| 5,557,436 A | 9/1996 | Blose et al. |

(Continued)

FOREIGN PATENT DOCUMENTS

| CN | 1609943 A | 4/2005 |
| CN | 1661447 A | 8/2005 |

(Continued)

OTHER PUBLICATIONS

Jun. 6, 2014 Office Action issued in U.S. Appl. No. 12/450,325.

(Continued)

*Primary Examiner* — Lisha Jiang
(74) *Attorney, Agent, or Firm* — Oliff PLC

(57) ABSTRACT

A method for manufacturing an image display device includes the step of forming a cured resin layer by interposing a photo-curable resin composition between a protection member and a display-side panel including an image display unit and a frame member and then photo-curing the photo-curable resin composition, with the photo-curable resin composition being disposed across between the image display unit and the frame member. In the manufacturing method, a high-viscosity resin composition having a viscosity of 3000 mPa·s or more and 12000 mPa·s or less is used as the photo-curable resin composition. Alternatively, after a gap between the image display unit and the frame member is sealed with a sealing film, a photo-curable resin composition is interposed between the display-side panel and the protection member.

5 Claims, 5 Drawing Sheets

(51) Int. Cl.
  *G02F 1/1333* (2006.01)
  *G02F 1/135* (2006.01)
  *G02B 1/11* (2015.01)
  *G02B 1/10* (2015.01)
(52) U.S. Cl.
  CPC .............. *G02F 2001/133311* (2013.01); *G02F 2201/086* (2013.01); *G02F 2201/50* (2013.01); *G02F 2202/023* (2013.01); *G02F 2202/28* (2013.01)

(56) References Cited

U.S. PATENT DOCUMENTS

| | | |
|---|---|---|
| 5,976,297 A | 11/1999 | Oka et al. |
| 6,204,896 B1 | 3/2001 | Matsuhira et al. |
| 6,218,446 B1 | 4/2001 | Arnold et al. |
| 6,383,558 B1 | 5/2002 | Fujiwara et al. |
| 6,461,709 B1 | 10/2002 | Janssen et al. |
| 6,654,083 B1 | 11/2003 | Toda et al. |
| 6,673,850 B1 | 1/2004 | Yamato et al. |
| 7,910,033 B2 | 3/2011 | Kamata et al. |
| 7,927,533 B2 | 4/2011 | Kamiya et al. |
| 8,773,624 B2 | 7/2014 | Shinya et al. |
| 2001/0039326 A1 | 11/2001 | Misumi et al. |
| 2002/0018163 A1 | 2/2002 | Yamamoto et al. |
| 2002/0118323 A1 | 8/2002 | Itou et al. |
| 2002/0131141 A1 | 9/2002 | Saitoh |
| 2003/0006704 A1 | 1/2003 | Morimoto et al. |
| 2003/0087054 A1 | 5/2003 | Janssen et al. |
| 2003/0137630 A1 | 7/2003 | Niiya |
| 2003/0199601 A1 | 10/2003 | Chang et al. |
| 2005/0126697 A1 | 6/2005 | Kuczynski |
| 2005/0172891 A1 | 8/2005 | Suzuki et al. |
| 2005/0190335 A1 | 9/2005 | Maruyama et al. |
| 2005/0249683 A1 | 11/2005 | L'Alloret |
| 2006/0108050 A1 | 5/2006 | Satake et al. |
| 2006/0128856 A1 | 6/2006 | Takahashi et al. |
| 2006/0159867 A1 | 7/2006 | O'Donnell |
| 2006/0222809 A1 | 10/2006 | Yamada et al. |
| 2006/0235101 A1 | 10/2006 | Messe |
| 2006/0272771 A1 | 12/2006 | Suzuki et al. |
| 2007/0046874 A1 | 3/2007 | Adachi et al. |
| 2007/0065091 A1 | 3/2007 | Hinata et al. |
| 2007/0133225 A1 | 6/2007 | Sakai |
| 2009/0128767 A1 | 5/2009 | Suezaki et al. |
| 2009/0162645 A1 | 6/2009 | Matsuhira |
| 2009/0283211 A1 | 11/2009 | Matsuhira |
| 2009/0296033 A1 | 12/2009 | Shinya et al. |
| 2010/0097552 A1 | 4/2010 | Shinya et al. |
| 2010/0097746 A1 | 4/2010 | Toyoda et al. |

FOREIGN PATENT DOCUMENTS

| | | | | |
|---|---|---|---|---|
| CN | 1788041 A | 6/2006 | | |
| CN | 1918515 A | 2/2007 | | |
| CN | 1936663 A | 3/2007 | | |
| CN | 101681571 B | 3/2013 | | |
| EP | 0 789 295 A1 | 8/1997 | | |
| EP | 1 261 011 A2 | 11/2002 | | |
| EP | 1 283 106 A1 | 2/2003 | | |
| EP | 1 739 473 A2 | 1/2007 | | |
| EP | 1 973 089 A1 | 9/2008 | | |
| EP | 2 051 227 A1 | 4/2009 | | |
| EP | 2 133 855 A1 | 12/2009 | | |
| JP | A-60-79388 | 5/1985 | | |
| JP | A-02-165188 | 6/1990 | | |
| JP | A-03-204616 | 9/1991 | | |
| JP | A-6-75701 | 3/1994 | | |
| JP | A-6-299126 | 10/1994 | | |
| JP | A-06-337411 | 12/1994 | | |
| JP | A-7-13173 | 1/1995 | | |
| JP | A-07-64282 | 3/1995 | | |
| JP | A-08-122759 | 5/1996 | | |
| JP | 08160407 A | * 6/1996 | ............ | G02F 1/1335 |
| JP | A-8-160407 | 6/1996 | | |
| JP | A-08-211353 | 8/1996 | | |
| JP | A-08-220554 | 8/1996 | | |
| JP | A-8-328023 | 12/1996 | | |
| JP | A-9-87593 | 3/1997 | | |
| JP | A-9-274536 | 10/1997 | | |
| JP | H-A-09274536 | 10/1997 | | |
| JP | A-09-318932 | 12/1997 | | |
| JP | A-10-081956 | 3/1998 | | |
| JP | A-10-083247 | 3/1998 | | |
| JP | A-10-095967 | 4/1998 | | |
| JP | A-10-293314 | 11/1998 | | |
| JP | A-2000-73025 | 3/2000 | | |
| JP | A-2000-111908 | 4/2000 | | |
| JP | A-2000-219868 | 8/2000 | | |
| JP | A-2000-258780 | 9/2000 | | |
| JP | A-2000-267118 | 9/2000 | | |
| JP | A-2000-284700 | 10/2000 | | |
| JP | A-2001-26758 | 1/2001 | | |
| JP | A-2001-37868 | 2/2001 | | |
| JP | A-2001-141907 | 5/2001 | | |
| JP | A-2001-290005 | 10/2001 | | |
| JP | B2-3220403 | 10/2001 | | |
| JP | A-2002-19013 | 1/2002 | | |
| JP | 2002-052552 A | 2/2002 | | |
| JP | A-2002-40208 | 2/2002 | | |
| JP | A-2002-52552 | 2/2002 | | |
| JP | A-2002-092957 | 3/2002 | | |
| JP | A-2002-108238 | 4/2002 | | |
| JP | 2002-258268 A | 9/2002 | | |
| JP | A-2002-528298 | 9/2002 | | |
| JP | B2-3327423 | 9/2002 | | |
| JP | 2002309199 A | 10/2002 | | |
| JP | A-2002-323861 | 11/2002 | | |
| JP | A-2002-341317 | 11/2002 | | |
| JP | A-2002-341776 | 11/2002 | | |
| JP | A-2002-348150 | 12/2002 | | |
| JP | A-2002-543545 | 12/2002 | | |
| JP | A-2003-003150 | 1/2003 | | |
| JP | A-2003-29644 | 1/2003 | | |
| JP | A-2003-096425 | 4/2003 | | |
| JP | A-2003-150065 | 5/2003 | | |
| JP | A-2003-207790 | 7/2003 | | |
| JP | A-2003-295780 | 10/2003 | | |
| JP | 2004-029711 A | 1/2004 | | |
| JP | A-2004-9665 | 1/2004 | | |
| JP | A-2004-61925 | 2/2004 | | |
| JP | 2004077887 A | * 3/2004 | ................ | G09F 9/00 |
| JP | A-2004-077887 | 3/2004 | | |
| JP | A-2004-115757 | 4/2004 | | |
| JP | A-2004-117545 | 4/2004 | | |
| JP | 2004-170907 A | 6/2004 | | |
| JP | A-2004-169023 | 6/2004 | | |
| JP | A-2004-212521 | 7/2004 | | |
| JP | A-2004-224855 | 8/2004 | | |
| JP | A-2004-256595 | 9/2004 | | |
| JP | A-2004-271935 | 9/2004 | | |
| JP | A-2004-279946 | 10/2004 | | |
| JP | 2004-325788 | 11/2004 | | |
| JP | A-2004-359769 | 12/2004 | | |
| JP | A-2005-23315 | 1/2005 | | |
| JP | 2005-076017 A | 3/2005 | | |
| JP | A-2005-55641 | 3/2005 | | |
| JP | A-2005-154581 | 6/2005 | | |
| JP | A-2005-179481 | 7/2005 | | |
| JP | 2005222397 A | * 8/2005 | .............. | G06F 3/033 |
| JP | A-2005-225127 | 8/2005 | | |
| JP | A-2005-234129 | 9/2005 | | |
| JP | A-2005-283749 | 10/2005 | | |
| JP | A-2005-314687 | 11/2005 | | |
| JP | A-2005-315901 | 11/2005 | | |
| JP | 2006011212 A | * 1/2006 | | |
| JP | A-2006-011212 | 1/2006 | | |
| JP | A-2006-11212 | 1/2006 | | |
| JP | A-2006-053425 | 2/2006 | | |
| JP | A-2006-053531 | 2/2006 | | |
| JP | A-2006-058753 | 3/2006 | | |
| JP | 2006-113435 A | 4/2006 | | |
| JP | A-2006-106503 | 4/2006 | | |

(56) References Cited

FOREIGN PATENT DOCUMENTS

| | | |
|---|---|---|
| JP | 2006-129678 A | 5/2006 |
| JP | 2006-154758 A | 6/2006 |
| JP | A-2006-150755 | 6/2006 |
| JP | A-2006-159412 | 6/2006 |
| JP | 2006-193730 | 7/2006 |
| JP | A-2006-189715 | 7/2006 |
| JP | A-2006-221187 | 8/2006 |
| JP | 2006-277828 A | 10/2006 |
| JP | 2006-282911 A | 10/2006 |
| JP | A-2006-267502 | 10/2006 |
| JP | A-2006-276105 | 10/2006 |
| JP | A-2006-292993 | 10/2006 |
| JP | 2006-298964 A | 11/2006 |
| JP | A-2006-308866 | 11/2006 |
| JP | A-2006-342222 | 12/2006 |
| JP | 2007009115 A | 1/2007 |
| JP | A-2007-10769 | 1/2007 |
| JP | 2007023147 A * | 2/2007 |
| JP | A-2007-023147 | 2/2007 |
| JP | A-2007-47621 | 2/2007 |
| JP | 2007-077321 A | 3/2007 |
| JP | 2007-102251 | 4/2007 |
| JP | 2007-102252 | 4/2007 |
| JP | A-2007-108592 | 4/2007 |
| JP | A-2007-114737 | 5/2007 |
| JP | A-2007-140220 | 6/2007 |
| JP | A-2007-156066 | 6/2007 |
| JP | 2007-186360 | 7/2007 |
| JP | 2007-249038 A | 9/2007 |
| JP | A-2007-298667 | 11/2007 |
| JP | 2008-005027 | 1/2008 |
| JP | A-2008-507617 | 3/2008 |
| JP | A-2009-274536 | 11/2009 |
| JP | 2015-163991 A | 9/2015 |
| JP | 2015-187742 A | 10/2015 |
| KR | A-2002-0030852 | 4/2002 |
| KR | 2005-0067162 A | 6/2005 |
| KR | 20070033920 A | 3/2007 |
| TW | 482913 | 4/2002 |
| TW | 2004 22708 A | 11/2004 |
| TW | 200704704 A | 2/2007 |
| TW | A-2007-10155 | 3/2007 |
| TW | 200903084 A | 1/2009 |
| WO | WO 01/87595 A1 | 11/2001 |
| WO | 2006011461 | 2/2006 |
| WO | WO 2006/129665 A1 | 12/2006 |
| WO | WO 2007/063751 A1 | 6/2007 |
| WO | WO 2007/066590 A1 | 6/2007 |
| WO | WO 2008/007800 A1 | 1/2008 |

OTHER PUBLICATIONS

Jul. 1, 2014 Office Action issued in Japanese Patent Application No. 2008-100891 (with translation).
Jul. 23, 2014 'Submission of Publications and the like' issued in Japanese Application No. 2012-181768 (with English translation.).
International Preliminary Report on Patentability issued on Jan. 21, 2010 in International Application No. PCT/JP2008/056996.
Extended European Search Report dated Jun. 25, 2010 in European Patent Application No. 08740099.0.
Office Action issued in U.S. Appl. No. 12/450,192 dated Sep. 16, 2010.
U.S. Appl. No. 12/450,325, filed Sep. 22, 2009 to Toyoda et al.
U.S. Appl. No. 12/449,796, filed Aug. 27, 2009 to Kamata et al.
U.S. Appl. No. 12/450,192, filed Sep. 15, 2009 to Kamiya et al.
International Search Report issued in PCT/JP2008/056818 mailed Jun. 10, 2008.
Extended European Search Report issued in European Patent Application No. 08739924.2 on Mar. 19, 2010.
International Search Report issued in PCT/JP2008/056601 mailed Jun. 10, 2008.
Extended European Search Report issued in European Patent Application No. 08740171.7 on Jun. 7, 2010.
Extended European Search Report issued in European Patent Application No. 08739711.3 on Mar. 17, 2010.
Mar. 23, 2011 Notification of Reason(s) for Refusal issued in Japanese Application No. 2008-105198.
Catalog "Liquefied Polyisoprene Rubber LIR", pp. 1-7, 2002.
May 9, 2011 Submission of Publications and the like issued in Japanese Application No. 2008-105198.
Jul. 6, 2011 Submission of Publications and the Like issued in Japanese Application No. 2008-098342.
Jul. 11, 2011 Submission of Publications and the Like issued in Japanese Application No. 2008-105198.
Oct. 3, 2011 Submission of Publications and the Like issued in Japanese Patent Application No. 2008-098342.
Submission of Publications and the Like issued on Dec. 13, 2011 in Japanese Patent Application No. 2008-105198.
Notification of Reasons for Refusal dated Aug. 6, 2008 (drafting date) and Dec. 26, 2008 (drafting date), Decision of Refusal dated May 18, 2009 (drafting date), and Preliminary Report dated Oct. 16, 2009 (creation date), of Japanese Patent Application No. 11-038529.
The Committee of Kagaku Daijiten, eds., "Kagaku Daijiten 2", p. 375, Kyoritsu Shuppan Co., Ltd., Jul. 15, 2006; Akira Matsumura, ed., Daijirin, p. 449, Sanseido Publishing Co., Ltd., Nov. 3, 1988; and the Committee of Shogakukan Daijisen, eds., "Daijisen", p. 492, Shogakukan Inc., Dec. 1, 1995.
Chinese Office Action issued on Jan. 30, 2012 in Chinese Application No. 200880015927.5.
"Submission of Publications and the Like" submitted on Dec. 30, 2011 in Japanese Application No. 2008-100891.
"Submission of Publications and the Like" submitted on Dec. 30, 2011 in Japanese Application No. 2008-101101.
WIPO Patentscope (WO2008007800), Jan. 17, 2008.
Submission of Publication and the like submitted on Jan. 13, 2012 for Japanese Patent Application No. 2008-98342.
Written Opinion of the International Preliminary Examining Authority of PCT/JP2007/064120 mailed Oct. 2, 2007.
Japanese Office Action drafted on Feb. 29, 2012 (mailed Mar. 7, 2012) in Japanese Patent Application No. 2008-105198.
Japanese Office Action dated Mar. 14, 2012 (mailed Mar. 21, 2012) for Japanese Patent Application No. 2008-185415.
"Submission of Publications and the like" filed Feb. 20, 2012 in Japanese Patent Application No. 2008-101101.
"Submission of Publications and the like" filed Feb. 20, 2012 in Japanese Patent Application No. 2008-100891.
Chinese Office Action dated Apr. 12, 2012 in Chinese Patent Application No. 200880019222.0.
Japanese Office Action dated Mar. 21, 2012 for Japanese Patent Application No. 2008-096150.
Japanese Office Action dated Mar. 21, 2012 for Japanese Patent Application No. 2012-048220.
May 25, 2012 Office Action issued in U.S. Appl. No. 12/450,325.
Japanese Office Action dated Jun. 18, 2012 (mailed Jun. 20, 2012) in Japanese Patent Application No. 2008-098342.
Jul. 11, 2012 Office Action issued in European Patent Application No. 08 740 099.0.
Jul. 9, 2012 Office Action issued in European Patent Application No. 08 740 171.7.
Jul. 9, 2012 Office Action issued in European Patent Application No. 11 000 219.3.
Jul. 1, 2008 International Search Report issued in PCT/JP2008/056996.
Apr. 26, 2011 Search Report issued in European Patent Application No. 11000219.3.
Mar. 23, 2011 Office Action issued in Chinese Patent Application No. 200880019222.0.
Aug. 15, 2012 Office Action issued in Japanese Patent Application No. 2008-185415.
Jun. 7, 2010 Extended European Search Report issued in European Patent Application No. 08740127.9.
Mar. 22, 2011 Office Action issued in Chinese Patent Application No. 200880011250.8.
Nov. 23, 2011 Office Action issued in Chinese Patent Application No. 200880011250.8.

(56) References Cited

OTHER PUBLICATIONS

Mar. 22, 2010 Extended European Search Report issued in European Patent Application No. 08740108.9.
Jan. 21, 2010 International Preliminary Report issued in International Patent Application No. PCT/JP2008/057005.
Apr. 11, 2012 Office Action issued in Chinese Patent Application No. 200880011341.1.
Feb. 22, 2012 Office Action issued in Taiwanese Patent Application No. 097112938.
Jul. 9, 2012 Office Action issued in European Patent Application No. 08740127.9.
Jun. 18, 2012 Office Action issued in Chinese Patent Application No. 200880011250.8.
Jul. 31, 2012 Office Action issued in European Patent Application No. 08 740 108.9.
May 25, 2011 Office Action issued in Chinese Patent Application No. 200880011341.1.
Aug. 16, 2012 Office Action issued in Taiwanese Patent Application No. 97112940.
Aug. 23, 2012 Office Action issued in U.S. Appl. No. 12/450,232.
Office Action issued Aug. 16, 2012 in Taiwanese Patent Application No. 097112939.
Oct. 9, 2012 Office Action issued in U.S. Appl. No. 12/450,108.
Oct. 22, 2012 Chinese Office Action issued in Chinese Patent Application No. 200880019222.0.
Aug. 16, 2012 Taiwanese Office Action issued in Taiwanese Patent Application No. 97112942.
Oct. 24, 2012 Submission of Publications and the like issued in Japanese Patent Application No. 2008-105198.
Oct. 25, 2012 Notification of Reasons for Refusal for Japanese Patent Application No. 10-240922.
Dec. 6, 2012 Chinese Office Action issued in Chinese Patent Application No. 201110129612.7.
Dec. 21, 2012 Chinese Office Action issued in Chinese Patent Application No. 200880011341.1.
Nov. 21, 2012 Japanese Office Action issued in Japanese Patent Application No. 2008-100891.
Dec. 10, 2012 Submission of Publications and the Like issued in Japanese Patent Application No. 2008-098342.
Dec. 26, 2012 Notification of Reasons of Refusal issued in Japanese Patent Application No. 2012-105372.
Dec. 26, 2012 Notification of Reasons of Refusal issued in Japanese Patent Application No. 2008-105198.
Feb. 20, 2013 Japanese Office Action issued in Japanese Patent Application No. 2008-098342.
Mar. 21, 2013 Office Action issued in U.S. Appl. No. 12/450,232.
Mar. 8, 2013 Office Action issued in Taiwanese Patent Application No. 97112939.
Apr. 2, 2013 Office Action issued in U.S. Appl. No. 12/450,325.
Apr. 10, 2013 Japanese Office Action issued in Application No. 2008-101101.
Mar. 21, 2013 Chinese Office Action issued in Application No. 2200880011250.8.
May 7, 2013 Japanese Office Action issued in Patent Application No. 2008-100879.
May 7, 2013 Japanese Office Action issued in Patent Application No. 2008-101983.
May 15, 2013 Office Action issued in U.S. Appl. No. 12/450,108.
Mar. 21, 2013 Chinese Office Action issued in Patent Application No. 200880011250.8.
May 9, 2013 Submission of Publications and the like in Japanese Application No. 2008-105198.
May 9, 2013 Office Action issued in Chinese Patent Application No. 200880019222.0.
Jul. 29, 2013 Office Action issued in U.S. Appl. No. 12/450,325.
Jul. 2, 2013 Office Action issued in Japanese Patent Application No. 2008-100891.
Jul. 16, 2013 Office Action issued in Japanese Patent Application No. 2012-105372.
Sep. 11, 2013 Office Action issued in U.S. Appl. No. 12/450,232.
Aug. 30, 2013 Submission of Publications and the like in Japanese Application No. 2008-101101.
Office Action issued in Chinese Application No. 201110129612.7 mailed Oct. 21, 2013.
Korean Office Action for Application No. 2009-7021093 mailed Dec. 16, 2013.
Japanese Office Action for Application No. 2008-101101 mailed Nov. 12, 2013.
Japanese Office Action issued in Application No. 2012-181768 mailed Jan. 14, 2014.
Japanese Office Action issued in Application No. 2013-089503 mailed Feb. 12, 2014.
Korean Office Action for Application No. 2009-7021086 mailed Feb. 14, 2014.
Korean Office Action for Application No. 2013-7026158 mailed Jan. 2, 2014.
Chinese Office Action for Application No. 200880011250.8 mailed Feb. 8, 2014.
Mar. 21, 2014 Office Action issued in U.S. Appl. No. 12/450,232.
Mar. 28, 2014 Decision of Refusal issued in Japanese Patent Application No. 2008-101101.
Apr. 8, 2014 'Submission of Publications and the like' issued in Japanese Patent Application No. 2013-215621.
May 9, 2014 Office Action issued in Korean Patent Application No. 2014-7003818.
Dec. 12, 2014 Extended European Search Report issued in European Patent Application No. 14002672.5.
Dec. 24, 2014 Office Action issued in Japanese Patent Application No. 2014-022038.
Dec. 2, 2014 Office Action issued in Chinese Application No. 201310103458.5.
Jan. 2, 2015 Office Action issued in U.S. Appl. No. 12/450,325.
Jan. 15, 2015 Submission of Publications issued in Japanese Patent Application No. 2013-215621.
Jan. 21, 2015 Submission of Publications issued in Japanese Patent Application No. 2013-215621.
Feb. 3, 2015 Office Action issued in Taiwanese Application No. 101130952.
Apr. 2, 2015 Office Action issued in Korean Patent Application No. 2015-7001682.
Mar. 27, 2015 Office Action issued in Taiwanese Patent Application 102112670.
May 7, 2015 Notification of Reason(s) of Refusal issued in Japanese Patent Application No. 2014-132099.
May 19, 2015 Office Action in Japanees Patent Appln. No. 2013-215621.
Jun. 4, 2015 Korean Office Action in Korean Patent Application No. 2015-7008267.
Jul. 31, 2014 Office Action issued in Taiwanese Patent Application No. 102118596 (with English translation).
Sep. 30, 2014 Office Action issued in Korean Patent Application No. 2009-7020757 (with English translation).
Sep. 30, 2014 Notification of Reason(s) for Refusal issued in Japanese Patent Application No. 2013-089503 (with English translation).
Sep. 30, 2014 Notification of Reason(s) for Refusal issued in Japanese Patent Application No. 2012-181768 (with English translation).
Dec. 16, 2013 Office Action issued in Korean Patent Application No. 2009-7020498 (with English translation).
Sep. 29, 2014 Final Rejection issued in Korean Patent Application No. 2009-7020498 (with English translation).
Oct. 18, 2013 Office Action issued in Korean Patent Application No. 2013-7020373 (With English Translation).
Oct. 28, 2014 Office Action issued in Korean Patent Application No. 2013-7020373 (With English Translation).
Nov. 11, 2014 Office Action issued in Japanese Patent Application No. 2014-018947 (With English Translation).
Nov. 25, 2014 Office Action issued in U.S. Appl. No. 12/450,232.
Sep. 1, 2014 Office Action Issued in JP Application No. 2013-215621 (with English translations).
Aug. 27, 2014 Office Action Issued in KR Application No. 2009-7021086 (with English translations).
Aug. 28, 2014 Office Action Issued in KR Application No. 2014-7013283 (with English translations).

(56) References Cited

OTHER PUBLICATIONS

Jul. 30, 2014 Office Action Issued in CN Application No. 201110129612.7 (with English translations).
Jul. 23, 2014 Office Action Issued in JP Application No. 2013-089503 (with English translations).
Jul. 20, 2015 Office Action issued in European Patent Applicaiton No. 08 740 108.9.
Jul. 13, 2015 Office Action issued in Taiwanese Patent Application No. 102112670.
Jun. 3, 2015 Office Action issued in Chinese Patent Application No. 2013-10578940.4.
May 21, 2015 Office Action in Taiwanese Patent Application No. 103112478.
Feb. 15, 2015 Office Action issued in Chinese Patent Application No. 201310056745.5.
Aug. 5, 2015 Office Action issued in Chinese Patent Application No. 201310103458.5.
Aug. 24, 2015 Office Action issued in Korean Patent Application No. 2009-7021192.
Oct. 12, 2015 Office Action issued in European Patent Application No. 08 740 099.0.
Oct. 12, 2015 Office Action issued in European Patent Application No. 08 740 127.9.
Sep. 1, 2015 Office Action issued in Taiwanese Patent Application No. 101130952.
Oct. 5, 2015 Office Action issued in European Patent Application No. 08778217.3.
Oct. 22, 2015 Office Action issued in Chinese Patent Application No. 201410025812.1.
Oct. 6, 2015 Office Action issued in European Patent Application No. 11009604.7.
Oct. 27, 2015 Office Action issued in Chinese Patent Application No. 201310056745.5.
Feb. 25, 2016 Office Action issued in U.S. Appl. No. 12/450,325.
Jan. 15, 2016 Office Action issued in connection with Chinese Patent Application No. 201310328607.8.
Jan. 20, 2016 Office Action issued in Chinese Application No. 201310578940.4.
Feb. 29, 2016 Office Action issued in Korean Patent Application No. 2015-7001682.
Mar. 1, 2016 Office Action issued in Japanese Patent Application No. 2015-104305.
Mar. 1, 2016 Office Action Issued in Japanese Patent Application No. 2015-104375.
Mar. 15, 2016 Office Action issued in Japanese Patent Application No. 2015-112377.

* cited by examiner (a)

(b)

IMAGE DISPLAY DEVICE

CROSS-REFERENCE TO RELATED APPLICATION

This application is a continuation of U.S. patent application Ser. No. 12/450,263 (now U.S. Pat. No. 8,821,996), filed Sep. 18, 2009, which claims priority under 35 U.S.C. §371 to International Application No. PCT/JP2008/056996, which claims priority to Japanese Patent Application Nos. 2008-005027, 2007-186360 and 2007-102239, filed Jan. 11, 2008, Jul. 17, 2007 and Apr. 9, 2007, respectively. The entire disclosure of each of the prior applications is hereby incorporated by reference herein in its entirety.

TECHNICAL FIELD

The present invention relates to an image display device such as a liquid crystal display (LCD) device used, for example, in a cellular phone, and in particular, to an image display device having a transparent protection member disposed on an image display unit and a method for manufacturing the same.

BACKGROUND TECHNOLOGY

One conventional example of such a display device is a liquid crystal display device 101 shown in FIG. 6. This liquid crystal display device 101 includes a transparent protection member 103 made of, for example, glass or plastic and disposed on a liquid crystal display panel 102.

In this case, to protect the surface of the liquid crystal display panel 102 and a polarizing plate (not shown), a spacer 104 is interposed between the liquid crystal display panel 102 and the protection member 103, so that a gap 105 is provided between the liquid crystal display panel 102 and the protection member 103.

However, the gap 105 present between the liquid crystal display panel 102 and the protection member 103 causes light scattering, and this results in a reduction in contrast and in brightness. The presence of the gap 105 is an obstacle to the reduction in thickness of the panel.

In view of the above problems, a technique has been proposed in which the gap between the liquid crystal display panel and the protection member is filled with a resin (for example, Patent Document 1). However, the stress during the cure shrinkage of the cured resin causes deformation of the optical glass plates sandwiching the liquid crystal of the liquid crystal display panel. This results in display defects such as irregularities in orientation of the liquid crystal material.

Unfortunately, when the gap between the liquid crystal display panel and the protection member is filled with the resin composition, the resin composition may adhere to the backlight side under some manufacturing conditions.

[Patent Document 1] Japanese Patent Application Laid-Open No. 2005-55641.

DISCLOSURE OF THE INVENTION

Problems to be Solved by the Invention

The present invention has been made in view of the problems in the conventional technologies. It is an object of the invention to provide a thin image display device which is free from display defects caused by the deformation of the image display unit, enables high-brightness and high-contrast image display, and has no unnecessary resin adhering to the backlight side.

Means for Solving the Problems

To solve the foregoing problems, the present invention provides a method for manufacturing an image display device, the method comprising the step of forming a cured resin layer by interposing a photo-curable resin composition between a protection member and a display-side panel including an image display unit and a frame member surrounding the image display unit and then photo-curing the photo-curable resin composition, the photo-curable resin composition being disposed across between the image display unit and the frame member, wherein a resin composition having a viscosity (as determined at 25° C., using a cone-plate rotational viscometer with a cone-plate taper angle of C35/2°, and at 10 rpm) of 3000 mPa·s or more and 12000 mPa·s or less is used as the photo-curable resin composition.

The present invention also provides an image display device, comprising: a display-side panel including an image display unit and a frame member surrounding the image display unit; a protection member disposed on the display-side panel; and a cured resin layer interposed between the display-side panel and the protection member, wherein the image display device further comprises a sealing film that covers a gap formed between the image display unit and the frame member, the sealing film being disposed across between the image display unit and the frame member, and the cured resin layer is disposed on the sealing film.

The present invention also provides a method for manufacturing the above image display device, the method comprising the step of forming a cured resin layer by interposing a photo-curable resin composition between a protection member and a display-side panel including an image display unit and a frame member surrounding the image display unit and then photo-curing the photo-curable resin composition, the photo-curable resin composition being disposed across between the image display unit and the frame member, wherein a gap formed between the image display unit and the frame member is covered with a sealing film, and the photo-curable resin composition is disposed on the sealing film.

In the above image display device and in the above methods of manufacturing image display devices, the cured resin layer is preferably made of a cured product which has a light transmittance of 90% or more in a visible region and a storage elastic modulus at 25° C. of $1.0 \times 10^7$ Pa or less and is formed of a photo-curable resin composition having a curing shrinkage ratio of 5% or less.

Effects of the Invention

Generally, the assembly of an image display device requires a certain gap between the image display unit and the frame member surrounding the image display unit, and the backlight appears on the bottom of the gap. In the image display device of the invention and the method of manufacturing the same, a photo-curable resin composition is interposed between the protecting member and the display-side panel into which the image display unit and the frame member are incorporated. Then, the photo-curable resin composition is photo-cured. In this photo-curing process, a photo-curable resin composition having a particular viscosity is used, or the gap between the image display unit and the frame member is covered with a sealing film. Therefore, the photo-curable resin composition is prevented from entering the gap between the image display unit and the frame member and flowing toward the backlight.

In this instance, a resin composition having a curing shrinkage ratio of 5% or less and forming a photo-cured resin layer having a light transmittance of 90% or more in a visible region and a storage elastic modulus at 25° C. of $1.0 \times 10^7$ Pa or less is used as the photo-curable resin composition. The use of such a resin composition can suppress the influence of the stress during curing and shrinkage of the resin on the image display unit and the protection member as much as possible. Therefore, advantageously, almost no strain occurs in the image display unit and the protection member. In addition, the size of the gap between the image display unit and the frame member do not change.

Therefore, in the present invention, the above advantageous effects work synergistically and allow high-brightness and high-contrast display without display defects.

Figure 1:
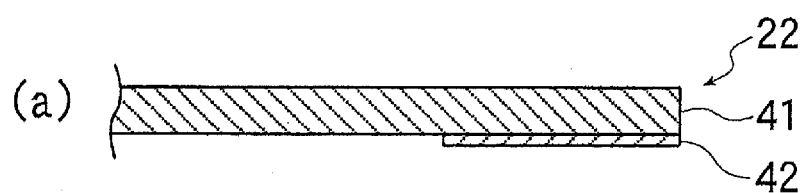
FIG. 1 is a series of cross-sectional views of a protection member.
Figure 1:
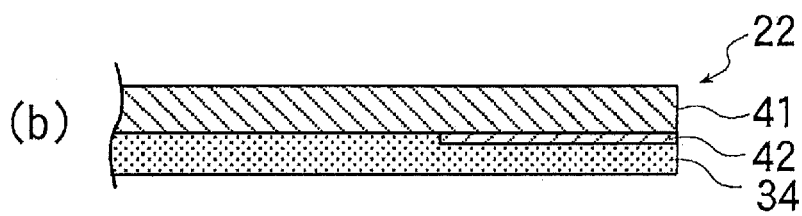

DESCRIPTION OF THE REFERENCE NUMERALS 11-13 image display deice
21, 24 display-side panel
22 protection member
30, 61 frame member
31 base
32 backlight
33 image display unit
34-36, 134 photo-curable resin composition or a layer of photo-curable resin composition
37, 57 gap
41 transparent plate
42 light-shielding film
44, 45, 46 cured resin layer
51 sealing film

BEST MODE FOR CARRYING OUT THE INVENTION

Hereinafter, preferred embodiments of the present invention will be described in detail with reference to the drawings. In the drawings, the same reference numerals denote the same or like elements.

First Embodiment

Figure 2:
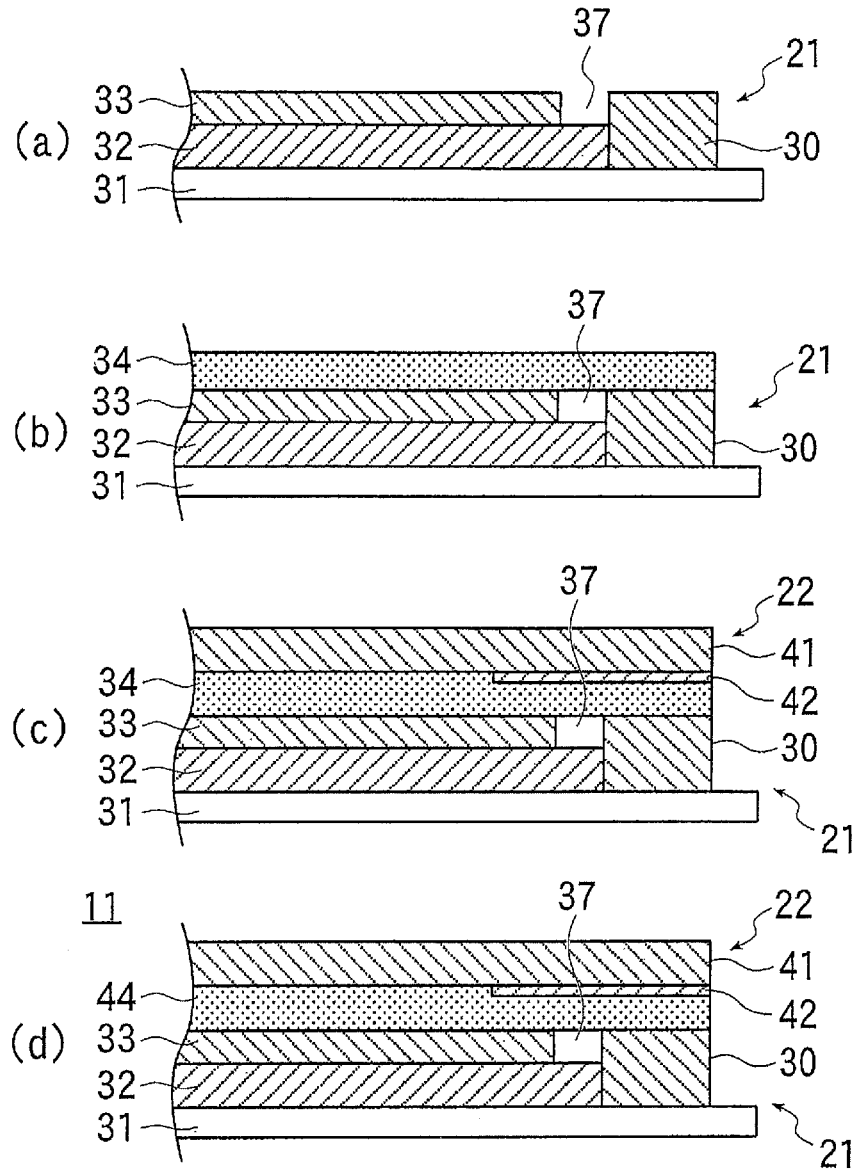
FIG. 2 is a series of diagrams illustrating a method for manufacturing an image display device of a first embodiment of the present invention.

FIG. 2 is a series of cross-sectional views illustrating the main part of a method for manufacturing an image display device 11 (FIG. 2(d)) according to a first embodiment of the present invention. In this image display device 11, a protection member 22 is bonded to a display-side panel 21 through a cured resin layer 44.

A description is given of the manufacturing process of the image display device 11. As shown in FIG. 2(a), in the display-side panel 21 before bonding through the cured resin layer 44, a frame member 30 surrounding an image display unit is disposed on a plate-like base 31, and a backlight 32 and the image display unit 33 including a liquid crystal panel smaller than the backlight 32 are disposed in that order on the base 31 so as to be located inside the frame member 30. The frame member 30 may be integrated with the base 31.

In this state, a gap 37 having a maximum width of several mm is formed between the image display unit 33 and the frame member 30, and the surface of the backlight 32 appears on the bottom of the gap 37.

On the other hand, as shown in FIG. 1(a), the protection member 22 includes: a transparent plate 41 made of an optical glass or a plastic such as an acrylic resin; and a black opaque light-shielding film 42 printed near the circumferential edges of the surface of the transparent plate 41. The light-shielding film 42 is provided to prevent the leakage of the light from the backlight 32 and to prevent reflection of light from the outside to improve the visibility of the image display device 11. A sheet- or film-like member may be used as the protection member 22.

In the method for manufacturing the image display device 11 of the first embodiment, first, a high viscosity photo-curable resin composition 34 is applied so as to be disposed across between the image display unit 33 and the frame member 30 of the display-side panel 21 in the above state to thereby cover the gap 37. The photo-curable resin composition 34 has a high viscosity sufficient to prevent it from entering the gap 37. More specifically, the viscosity at 25° C. thereof is 3000 mPa·s or more and 12000 mPa·s or less as measured by a cone-plate rotational viscometer (with a cone-plate taper angle of C35/2°, at 10 rpm).

In this manner, a layer of the photo-curable resin composition 34 can be formed on the display-side panel 21 with the gap 37 remaining present as shown in FIG. 2(b).

Preferably, the amount of the photo-curable resin composition 34 applied is adjusted such that the cured resin layer 44 formed by curing the layer of the photo-curable resin composition 34 has a thickness of 50 to 200 μm.

Next, the protection member 22 is arranged such that the surface thereof having the light-shielding film 42 formed thereon faces the display-side panel 21, and the transparent plate 41 is brought into contact with the surface of the layer of the photo-curable resin composition 34. Then, the transparent plate 41 is pressed against the layer of the photo-curable resin composition 34 while care is taken to avoid the inclusion of bubbles therebetween, whereby the transparent plate 41 is brought into intimate contact with the layer of the photo-curable resin composition 34, as shown in FIG. 2(c).

Subsequently, a UV lamp disposed above the protection member 22 is turned on and irradiates the layer of the curable resin composition 34 with UV rays through the transparent plate 41. The photo-curable resin composition 34 is thereby cured to form the cured resin layer 44 as shown in FIG. 2(d). In this manner, the image display device 11 having the protection member 22 and the display-side panel 21 bonded through the cured resin layer 44 is obtained.

When the width of the light-shielding film 42 is large, a sufficient amount of the UV light from the lamp above the protection member 22 may not reach the layer of the photo-curable resin composition 34 between the light-shielding film 42 and the display-side panel 21. In such a case, the layer of the photo-curable resin composition 34 may also be irradiated with UV rays from the side faces of the display-side panel 21 and the protection member 22.

In the obtained image display device 11, characters, graphics, and other objects formed in the image display unit 33 are illuminated with the backlight panel 32 and are observable when the image display device 11 is viewed from the protection member 22 side.

In the first embodiment, the layer of the photo-curable resin composition 34 is formed on the display-side panel 21. However, the image display device 11 shown in FIG. 2(d) may be formed as follows. First, the photo-curable resin composition 34 is applied to the light-shielding film 42-side surface of the protection member 22 to form the layer of the photo-curable resin composition 34 on the protection member 22 as shown in FIG. 1(b). Next, the layer of the photo-curable resin composition 34 is placed on the display-side panel 21 shown in FIG. 2(a) and irradiated with UV light in the same manner as described above.

Second Embodiment

Figure 4:
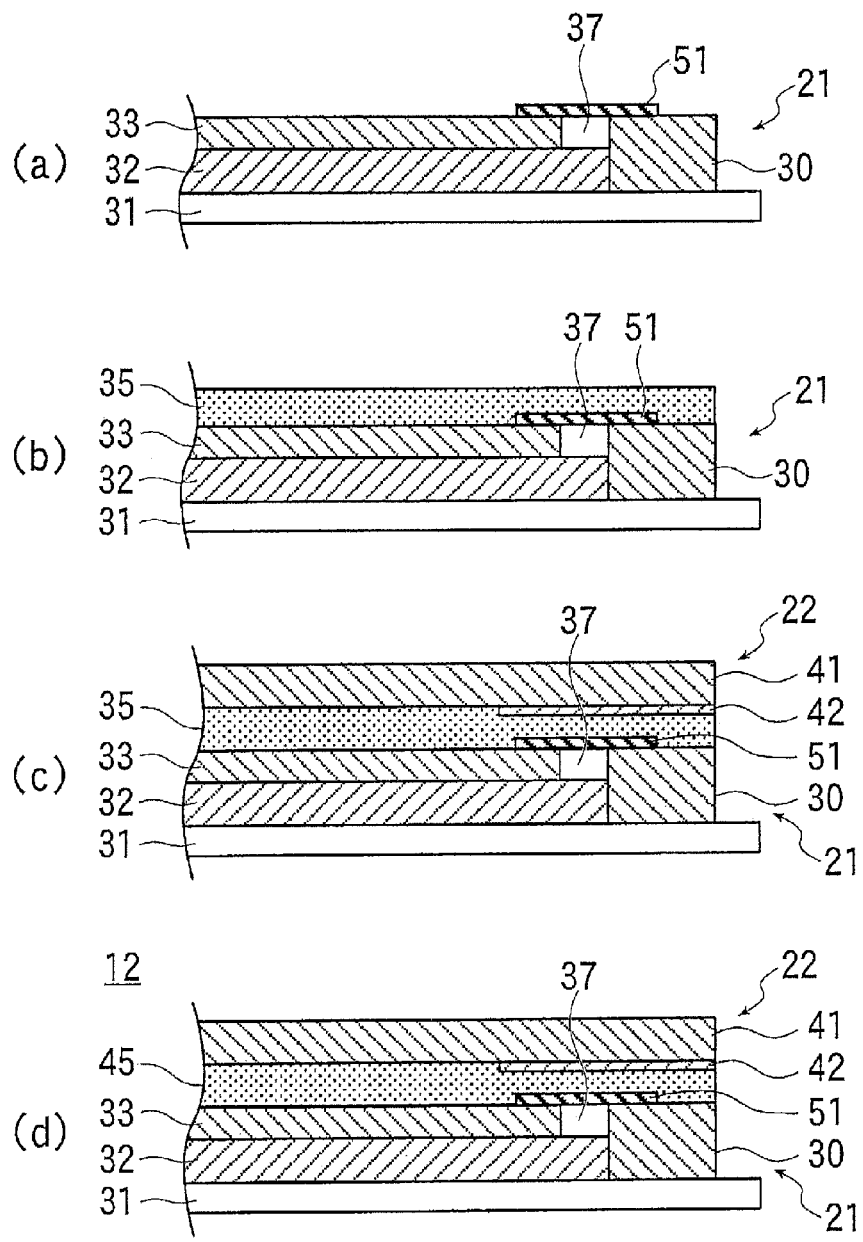
FIG. 4 is a series of diagrams illustrating a method for manufacturing an image display device of a second embodiment of the present invention.

FIG. 4 is a cross-sectional view illustrating the main part of a method for manufacturing an image display device 12 of a second embodiment.

Figure 3:
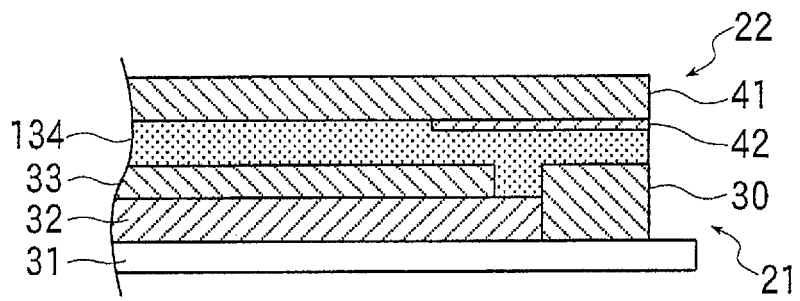
FIG. 3 is a cross-sectional view illustrating a state in which a photo-curable resin composition enters a gap.

In the method for manufacturing in the second embodiment, a resin composition having a low viscosity (less than 3000 mPa·s) is used as a photo-curable resin composition. If applied to the display-side panel 21 in the same manner as in the first embodiment, the photo-curable resin composition 134 flows into the gap 37, as shown in FIG. 3. When the photo-curable resin composition 134 flows into the gap 37 as shown in FIG. 3, the resin composition 134 may penetrate between the backlight 32 and the image display unit 33. This may cause display defects.

Therefore, in the second embodiment, before the photo-curable resin composition is applied to the display-side panel 21, an adhesive sealing film 51 is disposed so as to cover the gap 37 of the display-side panel 21 in the state shown in FIG. 2(a). More specifically, the sealing film 51 is disposed across between the image display unit 33 and the frame member 30 to thereby cover the gap 37 as shown in FIG. 4(a). One widthwise end of the sealing film 51 comes into intimate contact with the image display unit 33, and the other end comes into intimate contact with the frame member 30, so that the gap 37 is sealed.

Preferably, an adhesive film including a film base made of, for example, polyethylene terephthalate and an acrylate-based adhesive or bonding layer is used as the sealing film 51.

When the sealing film 51 is disposed on the display-side panel 21, the adhesive or bonding agent layer is not necessarily in a solid state. It is sufficient that the viscosity of the adhesive or bonding agent layer is large enough to prevent it from entering the gap 37 and from penetrating between the image display unit 33 and the backlight 32. More specifically, a curable resin composition having a viscosity of about 65000 mPa·s may be used. To allow the adhesive or bonding agent layer on the base film to maintain its shape so as not to enter the gap 37, an adhesive having a thixotropic ratio of about 3 may be used.

Next, as shown in FIG. 4(b), a photo-curable resin composition 35 is applied to the display-side panel 21 so as to spread over the image display unit 33, the sealing film 51, and the frame member 30. Then, the protection member shown in FIG. 1(a) is placed on the display-side panel 21 as shown in FIG. 4(c), and the layer of the photo-curable resin composition 35 is irradiated with UV rays in the state described above to cure the resin composition, whereby a cured resin layer 45 is formed as shown in FIG. 4(d). In this manner, the image display device 12 of the second embodiment is obtained in which the display-side panel 21 and the protection member 22 are bonded through the cured resin layer 45 with the gap 37 sealed with the sealing film 51.

Also in this embodiment, the image display device 12 shown in FIG. 4(d) may be obtained as follows. First, the layer of the photo-curable resin composition 35 is formed on the protection member 22 and brought into intimate contact with the display-side panel 21 in the state shown in FIG. 4(a), as shown in FIG. 4(c). Then, the photo-curable resin composition 35 is irradiated with rays of light.

Third Embodiment

Figure 5:
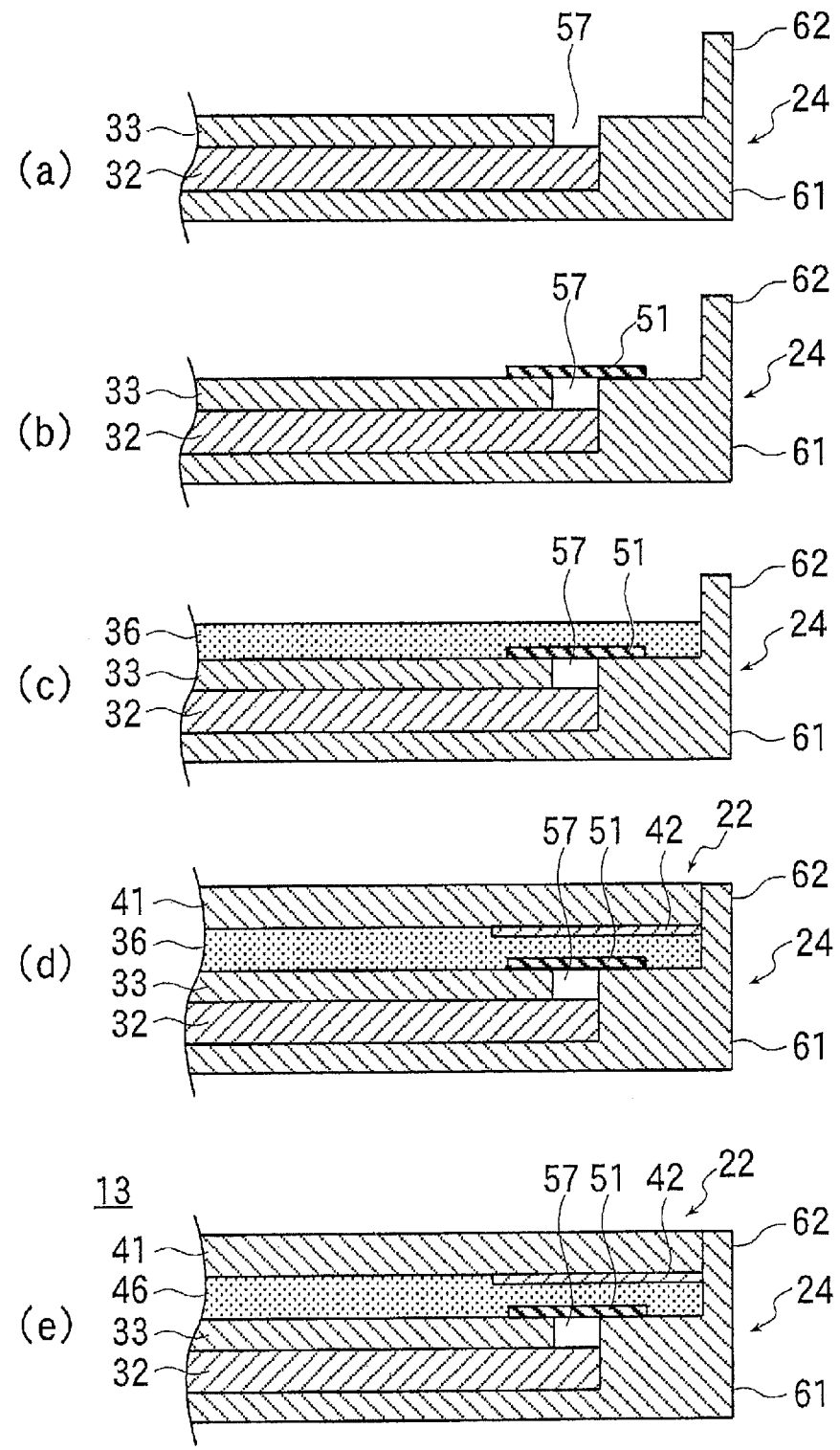
FIG. 5 is a series of diagrams illustrating a method for manufacturing an image display device of a third embodiment of the present invention.
Figure 6:
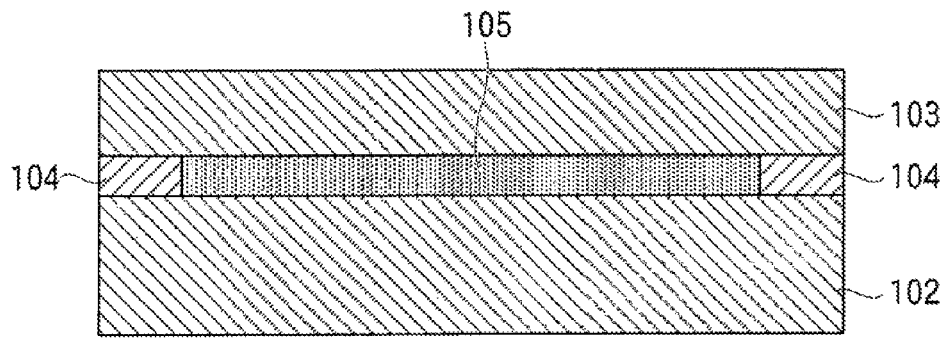
FIG. 6 is a cross-sectional view of a conventional image display device.

FIG. 5 is a series of cross-sectional views illustrating the main part of a method for manufacturing an image display device 13 of a third embodiment.

The manufacturing method in the third embodiment is different from the manufacturing method in the second embodiment in that a display-side panel 24 including a frame member 61 having a protruding portion 62 on its side circumferential edges is used as shown in FIG. 5(a).

Also in this display-side panel 24, a gap 57 is formed between the frame member 61 and the image display unit 33, and the backlight 32 appears on the bottom of the gap 57.

First, as shown in FIG. 5(b), the sealing film 51 is applied so as to cover the gap 57. More specifically, the sealing film 51 is applied so as to be disposed across between the image display unit 33 and the frame member 61, whereby the gap 57 is sealed.

Next, as shown in FIG. 5(c), a photo-curable resin composition 36 is applied dropwise to the display-side panel 24 so as to spread over the image display unit 33, the sealing film 51, and the frame member 61. The photo-curable resin composition 36 spread over the image display unit 33 forms a layer of the photo-curable resin composition 36. Subsequently, as shown in FIG. 5(d), the protection member 22 described above is placed on the layer of the photo-curable resin composition 36. In the display-side panel 24 used in this embodiment, the frame member 61 has the protruding portion 62 formed on its circumferential edges. Therefore, advantageously, the photo-curable resin composition 36 applied dropwise to the display-side panel 24 does not flow over the frame member 61. Accordingly, in the third embodiment, a resin composition having a viscosity less than that of the resin composition used in the second embodiment can be used as the photo-curable resin composition 36, and the degree of freedom with regard to the viscosity of the photo-curable resin composition 36 can be improved.

After the protection member 22 is placed on the layer of the photo-curable resin composition 36, the layer of the photo-curable resin composition 36 is irradiated with UV rays for curing, whereby a cured resin layer 46 is formed as shown in FIG. 5(e). In this manner, the image display device 13 of the third embodiment is obtained in which the protection member 22 and the display-side panel 24 come into intimate contact with each other through the cured resin layer 46.

Also in the third embodiment, the image display device 13 shown in FIG. 5(e) may be obtained as follows. First, the layer of the photo-curable resin composition 36 is formed on the protection member 22 and brought into intimate contact with the display-side panel 24 in the state shown in FIG. 5(b), as shown in FIG. 5(d). Then, the photo-curable resin composition 36 is irradiated with rays of light.

In the first to third embodiments, the photo-curable resin compositions 34 to 36 are prepared such that the cured product of the resin has a storage elastic modulus (25° C.) of preferably $1 \times 10^7$ Pa or less and more preferably $1 \times 10^3$ to $1 \times 10^6$ Pa, and a refractive index of preferably 1.45 or more and 1.55 or less and more preferably 1.51 or more and 1.52 or less. In addition, the photo-curable resin compositions are prepared such that, when the thickness of the cured product of the resin is 100 μm, the transmittance in the visible range is preferably 90% or more.

Generally, a curable resin composition containing the same main resin component as that of the above photo-curable resin composition may yield a cured product having a storage elastic modulus (25° C.) exceeding $1 \times 10^7$ Pa, when different co-present resin, monomer, and other components are used. A resin composition yielding such a cured product is not preferred as the photo-curable resin composition.

When the storage elastic modulus exceeds the above range, color unevenness may occur on the display.

Moreover, the photo-curable resin compositions 34 to 36 are prepared such that the curing shrinkage ratio is preferably 5.0% or less, more preferably 4.5% or less, particularly preferably 4.0% or less, and most preferably 0 to 2%. In this manner, the internal stress accumulated in the cured resins when the photo-curable resin compositions 34 to 36 are cured can be reduced, and the occurrence of strain at the interfaces between the cured resin layers 44 to 46 and the display-side panels 21 and 24 or between the cured resin layers 44 to 46 and the protection member 22 can be prevented. Therefore, when the photo-curable resin composition 34, 35, or 36 is interposed between the display panel 21 or 24 and the protection member 22, the cured product of the photo-curable resin composition 34, 35, 36, or 134 reduces light scattering at the interface between the cured resin layer 44, 45, or 46 and the display-side panel 21 or 24, or between the cured resin layer 44, 45, or 46 and the protection member 22. This increases the brightness of the displayed image and improves visibility.

However, when the curing shrinkage ratio is outside the above range, color unevenness may occur on the display.

The amount of internal stress accumulated in the cured product of a resin composition during curing can be evaluated by the average surface roughness of the cured resin obtained by applying dropwise the resin composition to a flat plate and curing the applied resin composition. For example, 2 mg of a resin composition is applied dropwise to a glass or acrylic plate and cured by UV irradiation to a cure ratio of 90% or more. When the average surface roughness of the resultant cured resin is 6.0 nm or less, the interfacial strain caused by the cured product of the photo-curable resin composition interposed between the display-side panel and the protection member is practically negligible. With the photo-curable resin compositions 34 to 36 preferably used in the present invention, the average surface roughness can be 6.0 nm or less, preferably 5.0 nm or less, and more preferably 1 to 3 nm. Therefore, the strain generated at the interfaces of the cured resin is practically negligible.

Any glass plate used for sandwiching the liquid crystal of a liquid crystal cell or used as the protection plate for a liquid crystal cell may be preferably used as the above glass plate. Any acrylic plate used as the protection plate for a liquid crystal cell may be preferably used as the above acrylic plate. The average surface roughness of such glass and acrylic plates is typically 1.0 nm or less.

Preferred examples of such a photo-curable resin composition include resin compositions containing: at least one polymer such as polyurethane acrylate, polyisoprene acrylate, esterified products thereof, hydrogenated terpene resin, or butadiene polymer; at least one acrylate monomer such as isobornyl acrylate, dicyclopentenyloxyethyl methacrylate, or 2-hydroxybutyl methacrylate; and a photo polymerization initiator such as 1-hydroxy-cyclohexyl-phenyl-ketone.

The photo-curable resin composition may further contain other additives such as a sensitizer, a plasticizer, and transparent particles in amounts within the range of the object of the invention.

The transparent plate 41 of the protection member 22 often has a UV cut function to protect the image display unit 33 from UV rays. Therefore, it is preferable to use, as the above photo polymerization initiator, a photo polymerization initiator that can initiate curing in the visible range (for example, trade name: SpeedCure TPO, product of Nihon SiberHegner K.K.) and to use visible light as the irradiation light.

The image display device of the present invention is applicable to cellular phones, display units of electronic devices such as portable game consoles, electronic personal organizers, and shape-measuring devices, and various panel displays such as organic EL and plasma display devices.

EXAMPLES

Example 1

Corresponding to the First Embodiment (1) Preparation of Resin Composition 1

70 Parts by weight of polyurethane acrylate (trade name: UV-3000B, product of Nippon Synthetic Chemical Industry Co., Ltd.), 20 parts by weight of isobornyl acrylate (trade name: IBXA, product of Osaka Organic Chemical Industry Ltd.), 4 parts by weight of a photo polymerization initiator (trade name: IRGACURE 184, product of Ciba Specialty Chemicals), and 1 part by weight of a photo polymerization initiator (trade name: SpeedCure TPO, product of Nihon SiberHegner K.K.) were fed to a glass vessel and mixed to give the target photo-curable resin composition.

(2) Evaluation of Resin Composition 1
(2-1) Viscosity

The viscosity (25° C.) of resin composition 1 obtained in (1) was measured using a cone-plate rotational viscometer (product of HAAKE, cone-plate taper angle: C35/2°, 10 rpm) and was found to be 10,000 mPa·s.

(2-2) Light Transmittance

Resin composition 1 obtained in (1) was applied dropwise to a white glass plate having a thickness of 100 μm so as to have a predetermined thickness, and the glass plate was carried into a UV conveyer, whereby the cured product of the resin was obtained.

The thus-obtained cured resin (thickness: 100 μm) was measured for light transmittance in the visible range using an ultraviolet and visible spectrophotometer (V-560, product of JASCO Corporation). The light transmittance of the cured resin was found to be 95% or more.

(2-3) Storage Elastic Modulus

The same cured resin as that used in (2-2) was measured for storage elastic modulus (Pa, 25° C.) at a measurement frequency of 1 Hz using a viscoelasticity measuring apparatus (DMS 6100, product of Seiko Instruments Inc.). The storage elastic modulus was found to be $1 \times 10^6$ Pa.

(2-4) Curing Shrinkage Ratio

The specific gravities of the uncured liquid resin and the cured solid were measured using an electronic densimeter (SD-120L, product of Alfa Mirage Co., Ltd.), and the curing shrinkage ratio was computed from the difference between the specific gravities using the equation below.

Curing shrinkage ratio (%)=(specific gravity of cured product−specific gravity of liquid resin)/(specific gravity of cured product)×100.  [Equation 1]

The curing shrinkage ratio was found to be 3.5%.

(2-5) Surface Roughness

The resin composition (2 mg) obtained in (1) was applied dropwise to a glass plate for a liquid crystal cell. Then, the strain (Ra: average surface roughness) in a predetermined area (2.93 mm×2.20 mm) on the glass plate surface caused by the internal stress during UV curing was measured using a three-dimensional non-contact surface roughness measuring apparatus (product of Zygo Corporation).

The surface roughness Ra was found to be 4.5 nm.

(3) Bonding Test of Display-Side Panel and Protection Member

According to the manufacturing method shown in FIG. 2, resin composition 1 obtained in (1) was applied dropwise to the protection member 22 including the light-shielding film 42 to form a layer of the curable resin composition over the entire protection member. Then, the protection member 22 was turned upside down and disposed in intimate contact with a liquid crystal cell being the image display unit 33 of the display-side panel 21 shown in FIG. 2(a). A gap 37 of 0.5 mm was formed between the liquid crystal cell and the frame member 30, and the backlight 32 appeared on the bottom of the gap 37. However, resin composition 1 did not penetrate in the gap 37.

Subsequently, resin composition 1 was irradiated with UV rays for curing to form the cured resin layer 44, whereby the image display device 11 was completed.

Comparative Example 1

Resin composition 2 was prepared using the same materials as those used in Example 1, including polyurethane acrylate (trade name: UV-3000B, product of Nippon Synthetic Chemical Industry Co., Ltd.), isobornyl acrylate (trade name: IBXA, product of Osaka Organic Chemical Industry Ltd.), a photo polymerization initiator (trade name: IRGACURE 184, product of Ciba Specialty Chemicals), and a photo polymerization initiator (trade name: SpeedCure TPO, product of Nihon SiberHegner K.K.). In this case, the amounts of the materials used were different from those in Example 1. The viscosity, transmittance, curing shrinkage ratio, and surface roughness were measured in the same manner as in Example 1, and a bonding test was performed. The results are shown in Tables 1 and 2 and compared with the results of Example 1.

TABLE 1

| | | Polyurethane acrylate (parts by weight) | Isobornyl acrylate (parts by weight) | Photopolymerization initiator (total parts by weight) | Viscosity (mPa · s) | Bonding test (penetration) |
|---|---|---|---|---|---|---|
| Example 1 | Resin composition 1 | 70 | 20 | 5 | 10000 | No |
| Comparative Example 1 | Resin composition 2 | 50 | 30 | 6 | 3000 | Yes |

TABLE 2

| | | Transmittance (%) | Curing shrinkage ratio (%) | Surface roughness (nm) | Storage elastic modulus (Pa) |
|---|---|---|---|---|---|
| Example 1 | Resin composition 1 | 95 or more | 3.5 | 4.5 | $1 \times 10^6$ |
| Comparative Example 1 | Resin composition 2 | 90 | 4.5 | 5.5 | $1 \times 10^6$ |

As is clear from Tables 1 and 2, when the viscosity was 3000 mPa·s or less, penetration of the resin composition was found regardless of other properties such as transmittance. This may cause image defects.

Example 2

Corresponding to the Second Embodiment (1) Preparation of Sealing Film

An acrylate-based resin adhesive was applied to a 100 μm-thick polyethylene terephthalate base film to a thickness of 100 μm, and the resultant base film was cut to a width of 5 mm to give the target sealing film.

(2) Bonding Test of Display-Side Panel and Protection Member

According to the manufacturing method shown in FIG. 4, the sealing film 51 prepared in (1) as above was applied to so as to cover the gap 37 (0.5 mm) between the frame member 30 and a liquid crystal cell corresponding to the image display unit 33 shown in FIG. 4(a). The sealing film 51 was disposed across between the frame member 30 and the liquid crystal cell.

Subsequently, the above resin composition 2 was applied dropwise to the protection member 22 including the light-shielding film 42 to form a layer of the photo-curable resin composition over the entire protection member. Then, the protection member 22 was turned upside down and disposed in intimate contact with the liquid crystal cell being the image display unit 33 of the display-side panel 21. A gap 37 of 0.5 mm was formed between the liquid crystal cell and the frame member 30, and the backlight 32 appeared on the bottom of the gap 37. However, the presence of the sealing film 51 prevented resin composition 2 from penetrating in the gap 37. Subsequently, resin composition 2 was irradiated with UV rays for curing to form the cured resin layer 45, whereby the image display device 12 was completed.

As described above, in Example 2 corresponding to the second embodiment, the presence of the sealing film 51 can prevent the resin composition from penetrating in the gap 37, even when the viscosity of the resin composition is 3000 mPa·s or less.

Example 3

Corresponding to the Second Embodiment (1) Preparation of Sealing Film

Resin composition 1 of Example 1 was used as an adhesive and applied to a 100 μm-thick polyethylene terephthalate film subjected to releasing treatment to a thickness of 50 μm, and the resultant film was cut to a width of 5 mm to give the target sealing film. At this stage, the sealing film was not photo-cured.

(2) Bonding Test of Display-Side Panel and Protection Member

According to the manufacturing method shown in FIG. 4, the sealing film 51 prepared in (1) of Example 3 was applied so as to cover the gap 37 (0.5 mm) between the frame member 30 and a liquid crystal cell corresponding to the image display unit 30 shown in FIG. 4(a). The sealing film 51 was disposed across between the frame member 33 and the liquid crystal cell. Then, a release film was removed.

Subsequently, the above resin composition 2 was applied dropwise to the protection member 22 including the light-shielding film 42 to form a layer of the photo-curable resin composition over the entire protection member. Then, the protection member 22 was turned upside down and disposed in intimate contact with the liquid crystal cell being the image display unit 33 of the display-side panel 21. A gap 37 of 0.5 mm was formed between the liquid crystal cell and the frame member 30, and the backlight 32 appeared on the bottom of the gap 37. However, the presence of the sealing film 51 prevented resin composition 2 from penetrating in the gap 37. Subsequently, resin composition 2 was irradiated with UV rays for curing to form the cured resin layer 45, whereby the image display device 12 was completed. The applied resin composition 1 used as an adhesive in the sealing film 51 was cured by the UV irradiation when forming the cured resin layer 45.

INDUSTRIAL APPLICABILITY

The present invention is useful as image display devices such as liquid crystal display devices.

The invention claimed is:

1. A method for manufacturing an image display device, the method comprising the steps of:

applying a layer of a photo-curable resin composition onto a display-side panel that includes an image display unit and a frame member surrounding the image display unit, the photo-curable resin composition being applied across and over both the image display unit and the frame member of the display-side panel, wherein a gap is formed between the image display unit and the frame member as a result of the photo-curable resin composition application, a top surface of the gap being defined by the layer of the photo-curable resin composition and a bottom surface of the gap being defined by a backlight;

disposing a protection member on the applied photo-curable resin composition; and photo-curing the applied photo-curable resin composition to form a cured resin layer, wherein the photo-curable resin composition has a viscosity (as determined at 25° C. and 10 rpm using a rotational viscometer with a cone-plate taper angle of C35/2°) of 3,000 mPa·s to 12,000 mPa·s; and the photo-curable resin composition contains:

at least one polymer selected from the group consisting of polyisoprene acrylate, an esterified product thereof, a hydrogenated terpene resin, and a polybutadiene polymer;

at least one acrylate monomer selected from the group consisting of isobornyl acrylate, dicyclopentenyloxyethyl methacrylate, and 2-hydroxybutyl methacrylate; and a photo-polymerization initiator.

2. The manufacturing method according to claim 1, wherein the photo-curable resin composition exhibits a curing shrinkage ratio of 5% or less and the cured resin layer has a storage elastic modulus at 25° C. of $1.0 \times 10^7$ Pa or less and has a light transmittance of 90% or more in a visible region.

3. The manufacturing method according to claim 2, wherein the cured resin layer has a storage elastic modulus at 25° C. of $1 \times 10^3$ to $1 \times 10^6$ Pa.

4. The manufacturing method according to claim 2, wherein the curing shrinkage ratio of the photo-curable resin composition is 4% or less.

5. The manufacturing method according to claim 1, wherein the cured resin layer has a thickness of 50 to 200 μm.

* * * * *